April 16, 1940.    J. D. KREIS    2,197,366
FISHING REEL
Filed Oct. 4, 1937
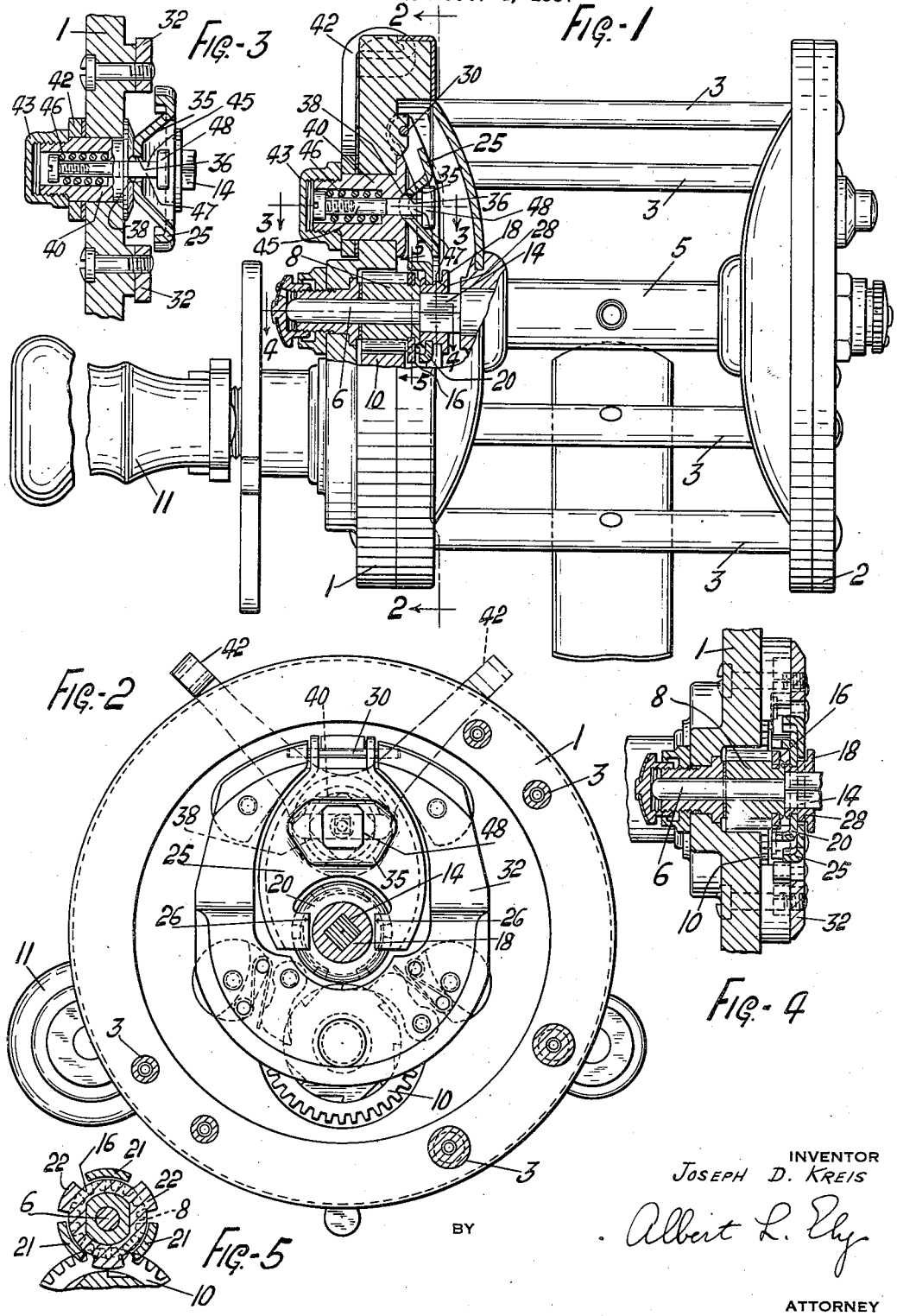
INVENTOR
JOSEPH D. KREIS
BY Albert L. Ely
ATTORNEY Patented Apr. 16, 1940

2,197,366

UNITED STATES PATENT OFFICE 2,197,366

FISHING REEL

Joseph D. Kreis, Cleveland Heights, Ohio, assignor to The Enterprise Manufacturing Company, Akron, Ohio, a corporation of Ohio Application October 4, 1937, Serial No. 167,085

11 Claims. (Cl. 242—84.7)

The present invention relates to fishing reels and particularly to that type known as a "free spool" reel in which provision is made to release the spool at will from the spool driving mechanism so that the spool is free to revolve on its axis. This is for the purpose of enabling the line to be drawn out freely when the fish is running with the bait. This type of reel is especially adapted to the larger salt-water reels, although its use is not limited to such reels. A salt-water reel of a standard form and type is shown and described herein, but it will be understood that the invention may be applied to any type or form of reel.

Free spool mechanisms are old and well known in this art, but the clutch mechanisms which have been employed are not durable, due to their design, are complicated and expensive to manufacture. It is the object of the present invention to improve upon the construction and design of the clutch mechanism and its operating parts so as to simplify the device, reduce the cost and increase its durability. It is also an object of the invention to design an improved operating mechanism which will be positive and effective in its action and avoid the disadvantages of the earlier devices. It is also an object of the invention to design a clutch mechanism for this particular purpose which will engage the spool and driving mechanism positively and without excessive wear. Due to the fact that when the clutch mechanism is to be engaged with the spool the latter is often revolving at high speed, it is desirable to have a clutch which will engage at once and without excessive wear on the clutch members. This object has been accomplished in the present device.

Other objects and advantages will be secured by the improved design, it being understood that the design shown herein may be modified or altered within the scope of the invention. The best known and preferred form of the invention is shown and described, but changes or modifications may be made in other embodiments and forms of the invention as set forth in the claims herein.

In the drawing:

Fig. 1 is a side elevation of a salt-water reel of standard design, a portion of the front plate being shown in section to illustrate the new free spool mechanism. In this view the mechanism is shown in engaged position.

Fig. 2 is a section on the line 2—2 of Fig. 1, the free spool position of the parts being shown in dotted lines.

Fig. 3 is a section through the operating mechanism on the line 3—3 of Fig. 1, but showing the parts as they are positioned for the free spool operations.

Fig. 4 is a section on the line 4—4 of Fig. 1; and

Fig. 5 is a detail of the clutch on the line 5—5 of Fig. 1.

In the drawing only those parts of the reel which deviate from standard construction are shown in detail and only such parts will be described in detail, as the improved mechanism may be incorporated in any reel design.

The reel frame comprises the front plate 1 and the back plate 2 connected by the usual pillars 3. The spool is indicated at 5 and its shaft at 6, the latter being mounted in the usual bearings on the front and back plates. Freely rotatable on the shaft 6 in the front plate is the driving pinion 8 which is engaged by the large driving gear 10 operated from the crank 11 in the usual manner.

Between the spool and the pinion the shaft 6 is formed with a square portion 14 which receives and makes driving connection with the shiftable clutch, to be described, and is of sufficient depth to allow the clutch to move into and out of engaging position with the pinion. The square portion of the shaft also serves as a positioning means for the pinion 8.

Driving engagement between the clutch and the pinion is obtained through a sheet metal stamping 16 at the base of the pinion and held in position by upsetting the metal of the pinion over the stamping. The clutch is shown at 18 and carries on the side adjacent the pinion a second sheet metal stamping 20 which is similarly held in place by upsetting the metal of the clutch member. The edge of the piece 20 is cupped or turned up and cut out to provide three elongated teeth 21 which are received in the spaces between three teeth 22 formed on the rim of the stamping 16. It will be observed that the spaces between the teeth 22 are longer than the teeth 21, the purpose being to secure ready engagement of the clutch members. When the spool is free and rotating rapidly, it was sometimes difficult in the prior reels to secure immediate engagement of the clutch device. By the design of the parts as shown, the clutch members will engage readily and wear of the parts is avoided. In earlier constructions it has been found necessary to make the clutch members of a high grade machined steel, but with the improved construction here shown, the parts may be made from stampings as described and at much reduced cost and, in addition, are more durable than the machined parts used in former constructions.

It will also be observed that in the design shown herein, the driving engagement is made between the pinion and the clutch, which latter element is keyed at all times to the spool. In the more usual forms of free spool reels, the engagement is between the clutch and the spool, the clutch being keyed to the pinion. While in some aspects of my invention the arrangement shown is not essential, better results are secured by keying the clutch to the spool as shown herein.

The clutch is shifted by means of a pivoted lever or yoke 25, the outer end of which is forked and provided with two fingers 26 which engage in a groove 28 formed on the outer surface of the clutch. The other end of the lever 25 is mounted on a pin 30 seated in a groove in the front plate and held in position by extensions from the usual bridge piece 32. This makes a secure and economical means for mounting the clutch operating lever.

Midway on the upper side of the lever is formed the depression 35 with inclined walls and at the base of the depression is formed a slot 36. The depression forms a rib on the opposite side of the lever which extends across the lever and is adapted, when in one position, to register and seat in a groove 38 extending across the top of a rotatable bushing or plug 40 mounted in the front plate. When the bushing 40 is rotated to the position shown in Fig. 3, the groove and depression are out of register and the lever 25 is thereby raised. The bushing 40 is moved to operate the lever 25 by means of the operating handle 42 which is secured on the flat end of the bushing by the cap screw 43.

The lever 25 is yieldingly held against the bushing by means of a pin 45 sliding therein and actuated by a spring 46. The pin is formed with a squared shank portion 47 that fits within a similarly shaped axial aperture in the bushing, which arrangement insures the pin turning with the bushing. The outer end of the pin passes through the slot 36 and is provided with a square head 48 which fits in the depression, as shown in Fig. 1. The underside of the head is rounded slightly, and this, in conjunction with the pressure from the spring 46, causes the pin to snap into position at either end of its travel. This arrangement assists in the positiveness of the action of the device, for the lever 42 tends to move to its full position as it approaches the end of its throw.

It will be seen that the arrangement and organization of the parts effect substantial improvements in reels of the free spool type.

What is claimed is:

1. In a fishing reel of the free spool type, comprising a movable clutch member between the spool drive and the spool, a pivoted lever associated with the clutch, said lever being formed with a lateral rib intermediate its length, means to rock the lever including a bushing formed with a lateral depression across its face, means to turn the bushing to bring the depression and rib into and out of register, and means carried by the bushing yieldingly urging the lever against the face of the bushing.

2. In a fishing reel of the free spool type, comprising a movable clutch member between the spool drive and the spool, a pivoted lever associated with the clutch, said lever being formed with a lateral rib intermediate its length, means to rock the lever including a bushing formed with a lateral depression across its face, means to turn the bushing to bring the depression and rib into and out of register, and yielding means tending to hold the lever against the bushing, said yielding means comprising a spring-pressed pin carried by the bushing and engaged with said lever.

3. In a fishing reel of the free spool type, a spool and spool shaft, a pinion rotatable on the spool shaft, a clutch feathered on the spool shaft, interengaging means on the pinion and clutch, and means to shift the clutch including a pivoted lever having a lateral depression forming a rib on the underside of the lever, a bushing rotatably mounted in the reel and having a groove to register with the rib in one position, a pin extending through the lever having a non-rotating fit with the bushing and having a non-circular head seated in the depression of the lever, and a spring acting on the pin and serving to urge the lever against the bushing.

4. In a fishing reel of the free spool type, a spool and spool shaft, a pinion rotatable on the spool shaft, a clutch feathered on the spool shaft, interengaging means on the pinion and clutch, and means to shift the clutch including a pivoted lever having a lateral depression forming a rib on the underside of the lever, a bushing rotatably mounted in the reel and having a groove to register with the rib in one position, a pin extending through the lever having a non-rotating fit with the bushing and having a non-circular head seated in the depression in the lever, the underside of the head being rounded and riding on the walls of the depression, and a spring acting on the pin and serving to cause the latter to urge the lever against the bushing.

5. In a fishing reel of the free spool type, comprising a front plate, a shiftable clutch to engage and disengage the spool and its driving means, a lever connected to the clutch, a pivot pin for the lever mounted in a groove in the front plate, a bridge piece attached to the front plate and overlying the pivot pin, and yielding means engaging the lever and urging the pivot pin into said groove.

6. A fishing reel of the free spool type, comprising a front plate, spool and spool shaft, a clutch movable on the spool shaft, a pivoted lever engaging the clutch, a spring to move the lever in one direction, a rib on one side of the lever defining a recess on the opposite side thereof, a rotatable bushing in the front plate, a groove on the end of the bushing, a manually operated lever to rotate the bushing to bring the rib and bushing groove into and out of register, and means engaged in the recess in the clutch lever to assist in throwing both levers to their extreme positions.

7. A fishing reel of the free spool type, comprising a front plate and spool, a movable clutch to connect or disconnect the spool and its driving mechanism, a pivoted lever engaging the clutch, a rotating bushing in the front plate, mating groove and rib on the confronting faces of the bushing and lever, the rib on the lever providing a recess in the opposite face thereof, means to rotate the bushing to bring the groove and rib into or out of register, and means carried by said bushing and engaging in the recess in said lever to assist the throw of the lever to its extreme positions.

8. A fishing reel of the free spool type, comprising a front plate and spool, a movable clutch to connect or disconnect the spool and its driving mechanism, a pivoted lever engaging the clutch, a rotating bushing in the front plate, mating groove and rib on the bushing and lever, means to rotate the bushing to alternative positions to bring the groove and rib into or out of register, and means to assist the throw of the lever to its extreme positions including a spring carried by the bushing acting to hold the lever against the bushing.

9. A fishing reel of the free spool type, comprising a front plate and spool, a movable clutch member to connect or disconnect the spool and its driving mechanism, a lever connected with the clutch member, a rotating bushing in the front plate, mating groove and rib on the bushing and lever, means to rotate the bushing to bring the groove and rib into or out of register, and means to assist the throw of the lever to its extreme positions including a spring and a pin with a non-circular head positioned within a depression in the lever and bearing against the lever to hold the same against the bushing and to cause the lever to snap to its extreme positions when the bushing and pin are rotated in unison, said pin being carried by said bushing and being non-rotatable with relation thereto.

10. A fishing reel of the free spool type, comprising a front plate and spool, a movable clutch member to connect or disconnect the spool and its driving mechanism, a lever connected with the clutch member, a rotating bushing in the front plate, mating groove and rib on the bushing and lever, means to rotate the bushing to bring the groove and rib into or out of register, and means to assist the throw of the lever to its extreme positions including a spring and a pin engaged thereby, said pin extending through said lever and formed with a non-circular head seated in a depression therein and bearing against the lever to hold the lever against the bushing and cause the lever to snap to its extreme positions when the bushing and pin are rotated in unison, said pin being carried by said bushing in non-rotatable relation thereto.

11. A fishing reel of the free spool type, comprising a front plate and spool, a movable clutch member to connect or disconnect the spool and its driving mechanism, a lever connected with the clutch member, a rotating bushing in the front plate, mating groove and rib on the bushing and lever, means to rotate the bushing to bring the groove and rib into or out of register, and means to assist the throw of the lever to its extreme positions including a spring and a pin engaged thereby, said pin extending through the lever and formed with a non-circular head seated in a depression therein, said pin being rotatable with the bushing and bearing against the lever to hold the lever against the bushing and cause the lever to snap to its extreme positions when the bushing is rotated.

JOSEPH D. KREIS.